No. 854,116. PATENTED MAY 21, 1907.
G. P. STANLEY & W. W. TAINTER.
TOOTHPICK MACHINE.
APPLICATION FILED MAR. 6, 1906.

4 SHEETS—SHEET 1.

Witnesses:
J. Henry Parker
Alice Tarr

Inventors.
Willis W. Tainter
George P. Stanley
by Macleod, Calver, Copeland & Dike
Attorneys.

No. 854,116. PATENTED MAY 21, 1907.
G. P. STANLEY & W. W. TAINTER.
TOOTHPICK MACHINE.
APPLICATION FILED MAR. 6, 1906.

4 SHEETS—SHEET 4.

UNITED STATES PATENT OFFICE.

GEORGE P. STANLEY AND WILLIS W. TAINTER, OF DIXFIELD, MAINE.

TOOTHPICK-MACHINE.

No. 854,116.　　　　Specification of Letters Patent.　　　　Patented May 21, 1907.

Application filed March 6, 1906. Serial No. 304,503.

*To all whom it may concern:*

Be it known that we, GEORGE P. STANLEY and WILLIS W. TAINTER, citizens of the United States, residing at Dixfield, county of Oxford, State of Maine, have invented a certain new and useful Improvement in Toothpick-Machines, of which the following is a specification, reference being had therein to the accompanying drawings.

Our invention has for its object an improved machine for cutting or dieing out blanks for tooth picks or similar articles.

In the following description taken in connection with the accompanying drawings which form a part thereof we have fully set forth and described our invention and in the claims at the end of the specification we have pointed out and clearly defined the novel features thereof.

Figure 1:
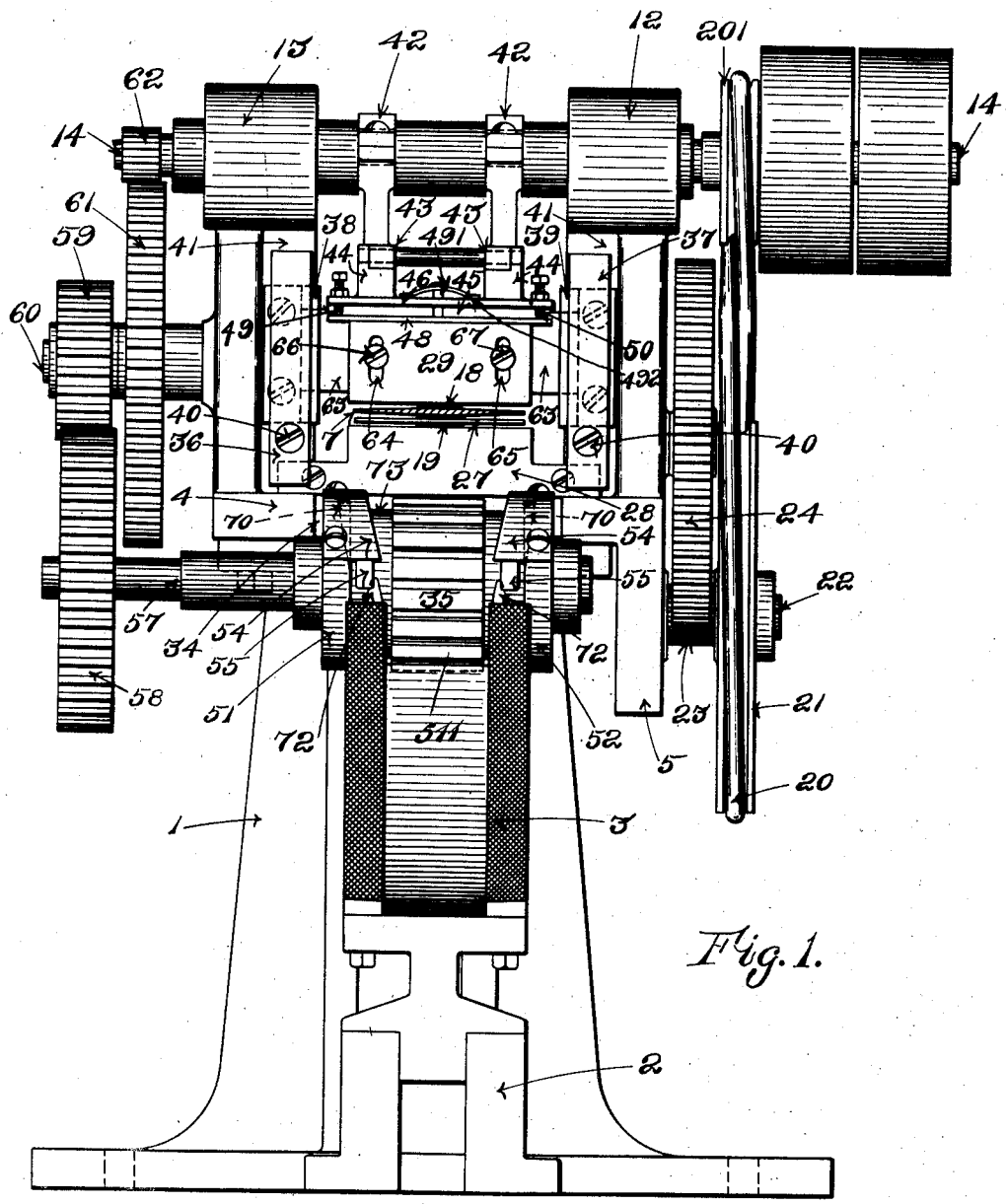
Figure 2:
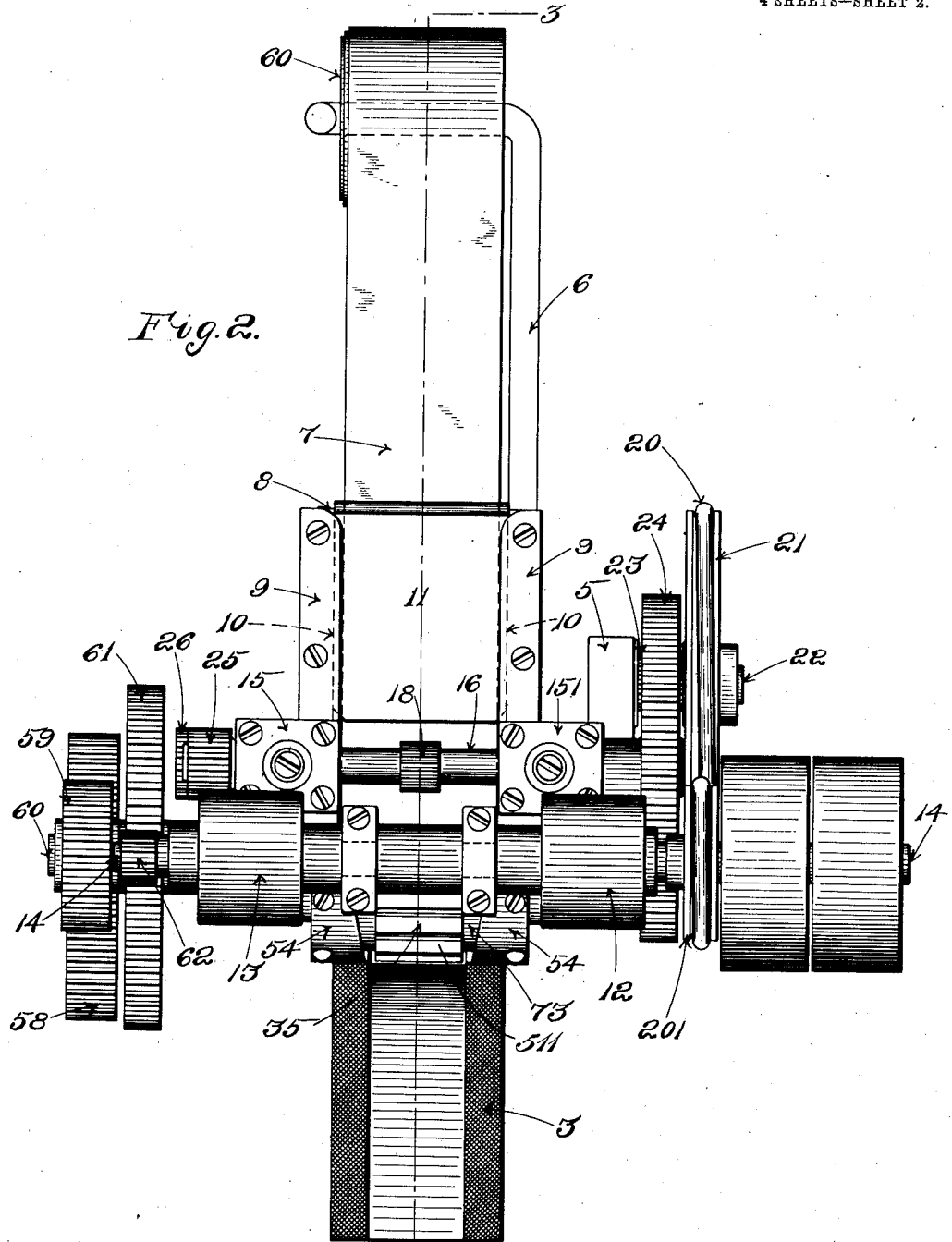
Figure 3:
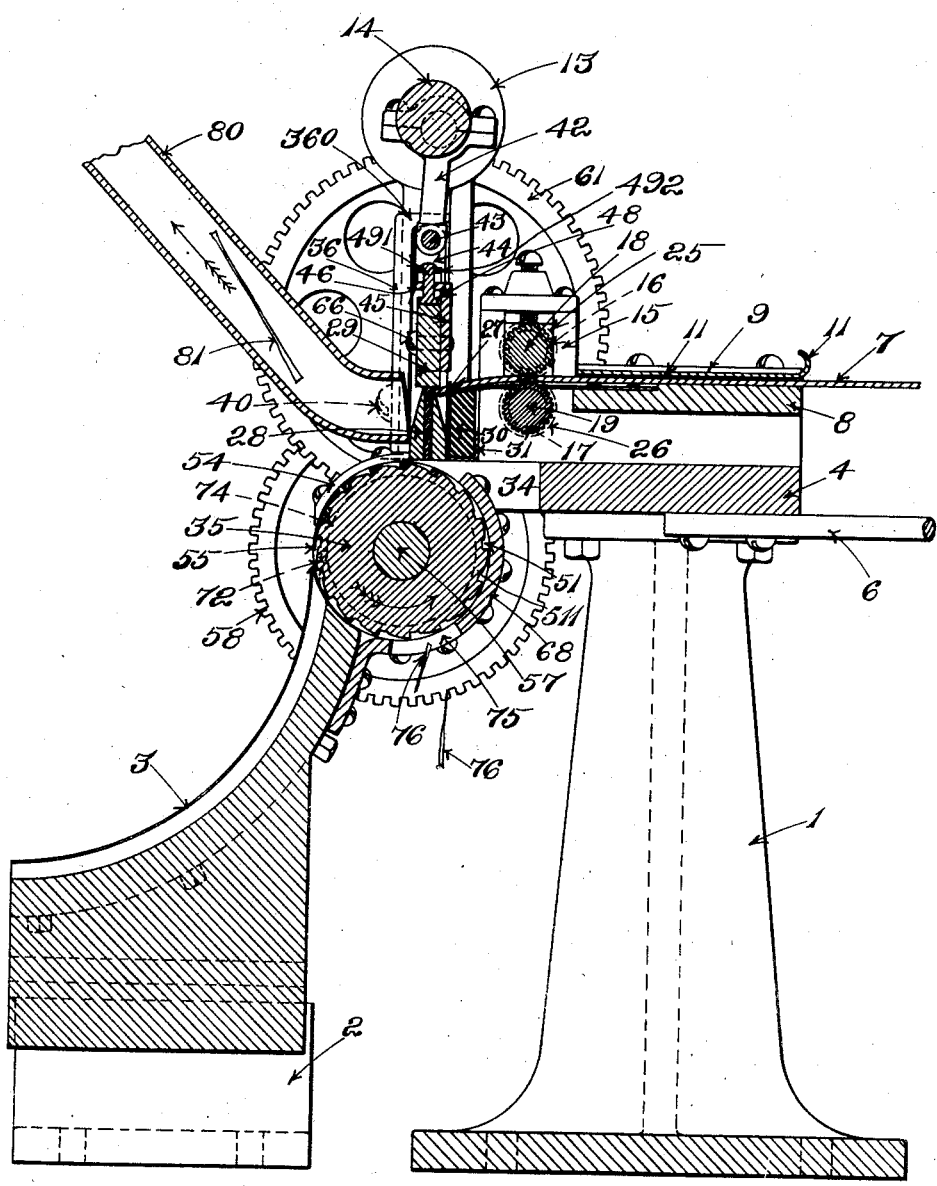
Figure 4:
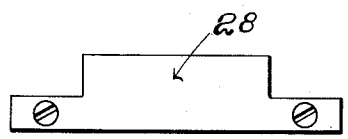
Figure 5:
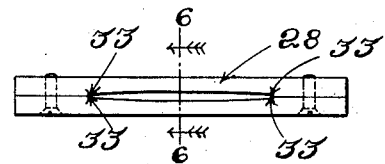
Figure 7:
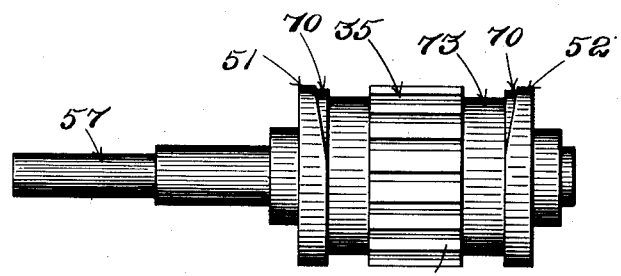
Figure 8:
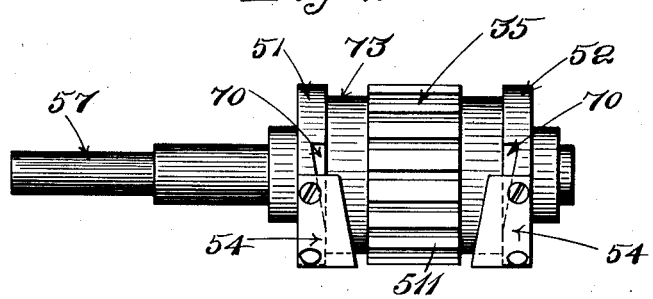
Figures 6, 9:
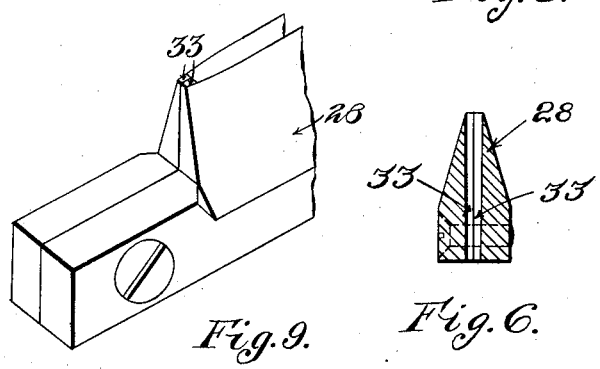

Having reference to the drawings, Figure 1 is a front elevation of a machine embodying our invention and showing also the concave of a tooth pick finishing machine to which the feed device of the blank forming machine is attached as will be hereinafter more fully explained. Fig. 2 is a plan view thereof. Fig. 3 is a vertical section on line 3—3 of Fig. 2. Fig. 4 is a detail of the cutting die. Fig. 5 is a plan view of the cutting die. Fig. 6 is an enlarged section of the cutting die on line 6—6 Fig. 5. Fig. 7 is a detail elevation of feed roll and housing. Fig. 8 is a plan view thereof with the shield attached. Fig. 9 is a perspective view of a portion of the cutting die enlarged.

In the manufacture of wooden tooth picks or similar articles a veneer is employed which is a continuous strip of wood usually in the form of a coil, said strip being of a width equal or substantially equal to the length of the tooth pick which it is desired to make, and of a thickness sufficiently greater than the diameter of the tooth pick to permit the tooth pick to be formed therefrom.

In the manufacture of double pointed tooth picks for which our present invention is particularly adapted the veneer is beveled at each edge so that its shape in cross section may more nearly conform to the shape of the finished tooth pick. The blanks from which the tooth picks are formed are cut from this veneer by means of a die and heretofore so far as known to us the green or undried blanks as they come from this machine have been dried before being subjected to the operation of the finishing machine.

By our method of manufacture the blanks are subjected to the operation of the finishing machine before being dried and our present invention contemplates not only a dieing out or blank forming machine but also in connection therewith a special feed by means of which the blanks are fed one at a time at a uniform distance apart to the finishing machine.

For the purpose therefore of making our invention more clear we have shown in the accompanying drawings the concave of the finishing machine and the manner in which in practice we have connected our present invention therewith. The finishing machine will be found fully set forth in our application for Letters Patent filed November 6, 1905, Serial No. 285,953.

Having reference to the drawings, 1 is a support which may be of any suitable form or construction and which is preferably provided with a base by means of which the support may be rigidly secured by screws or bolts to a bench or to the base of a finishing machine with which our present invention is preferably employed as hereinbefore stated.

2 is a portion of the support of the finishing machine and 3 is the concave thereof which need not be described in detail herein.

4 is a table which is provided at one side with a downwardly projecting portion 5 which serves as a support for the operating mechanism and on top with two uprights 12 and 13 in the upper ends of which the main shaft 14 is journaled.

A bent arm 6, Fig. 2 projects rearwardly from the table and serves as a support for the coil of veneer 60. The free end of the veneer 7 projects forwardly over a supporting frame 8 Fig. 3, which is secured on the table and which is provided at either side with guides 9 and which serve to guide the veneer properly to the feed mechanism and die or cutter. The guides are provided above the veneer with lengthwise slots 10 which receive a plate 11 which fits closely over the veneer, see Fig. 3, and serves to hold it flat while it is being fed forward.

At the forward end of the frame 9 two uprights 15 are located. In these uprights are journaled the upper and lower feed shafts 16 and 17 respectively. Each of the feed shafts is provided with a toothed feed roll, the said feed roll on the upper shaft being designated 18 and that on the lower shaft being designated 19. The veneer passes between these toothed rolls and is fed forward by them to the cutting die 28. This feed mechanism is actuated by means of a belt 20 which passes around a grooved pulley 201 on the main shaft 14; this belt drives the pulley 21 which is journaled on a stud 22 fast on the downwardly projecting side portion 5 of the frame. The hub of the pulley 21 has secured thereto a pinion 23 which meshes with a gear 24 fast to the end of the upper feed shaft 16. The lower feed shaft 17 is driven from the upper feed shaft by means of gears 25 and 26 which are mounted on the upper and lower feed shafts respectively. As the veneer passes the feed rolls 18 and 19 and after it has passed these rolls it is supported by means of a spring plate 27 see Fig. 3 which is secured at its rear end to the frame 8 and projects forwardly so that its front edge is in close proximity to the cutting die. The lower feed roll 19 engages the under surface of the veneer 7, the spring plate 27 being cut away at this point to accommodate the said lower feed roll 19, as will be clear from Fig. 3. As the veneer is forced downwardly onto the cutting die 28 by means of the cutting block 29 in order to cut a blank the spring plate is depressed and as soon as the cutting block 29 is raised again the spring plate rises carrying the forward end of the veneer slightly above the level of the edge of the cutter or die so that as the veneer is again fed forward it will pass over the die and be in proper position when the block 29 again descends to have a blank cut therefrom. As it is very important that the veneer should be raised to a point slightly above the edge of the die after a blank has been cut, we preferably assist the spring plate 27 and insure the raising of the veneer by placing under the plate near its front edge a piece 30 of resilient material, as rubber, which is held in place by means of a suitable holder 31, preferably of metal, which rests directly behind the die and supports the rubber 30 in contact with the under side of the spring plate 27. As the plate is depressed or bent downwardly as shown Fig. 3, the rubber is compressed and as the cutter block rises permitting the spring plate to rise, raising the veneer again into a horizontal position, the rubber expands and assists or renders certain the return of the spring plate and the raising of the veneer.

The cutting die 28 is a hollow die formed in two parts which are so shaped that when they are secured together a central opening or space will be formed corresponding in shape to the shape to the blank which is to be cut from the veneer.

In order that the blanks may be prevented from endwise movement in the die and thus delivered properly to the feed wheel 35, we form, preferably, on each half of the die at each end of the opening in the die an abutment or shoulder 33, see Figs. 5 and 6 and 9. If the ends of the opening tapered to a point, the blank would be liable to catch or become wedged in. By this means the blanks are caused to pass evenly through the die and be delivered evenly to the feed wheel 35. We consider this peculiar construction of cutting die therefore to be important. The die 28 rests upon the forward end of the table 4, said forward end being cut away centrally as indicated at 34, Fig. 3, to accommodate the grooved feed roll 35 which operates to carry the blanks from a position directly underneath the hollow die and deliver them to the finishing machine. The die 28 is supported at its ends only on the table 4, see Fig. 1, and as will be clear, projects across the opening in the table so that the blanks as they fall from the die will drop into the grooves in the said feed roll 35. For the purpose of holding the die securely in place we employ two clamps 36 and 37 which are placed vertically in front of the ends of the die one at each end thereof, and have their upper ends bent as at 360, Fig. 3, over guideways 38 and 39 which guide the cutting block holder in its vertical reciprocating movement. The clamps 36 and 37 are secured by screws 40 which pass through the clamps into a threaded hole in a vertical web portion 41 on the inside of the upright supports 12 and 13. By means of these clamps, the die is secured at each end between the clamp and the said web portion. The cutting block is actuated from the main shaft 14 by means of eccentric connections 42 of usual construction. These connections are pivoted at 43 to projections 44 which are fast to the block holder 45. These projections preferably extend downward at the rear of the block holder 45 and are secured thereto by screws. The block holder 45 consists of a plate preferably of metal bent at its upper edge as shown at 46 to project over the top of the block. To the front of the block holder 45 the block 29 which is preferably of wood is secured by means of the screws 66 and 67. A plate 48 is located above the block and the block may be adjusted by setting down this plate 48 by means of the screws 49 and 50 at either end thereof which pass through the flange 46 of the block holder. The block 29 and plate 48 are normally held in their highest position with said plate against the lower ends of the screws 49 and 50 by means of the spring 492 and the stud 491 (see Figs. 1 and 3), which passes through the flange or bent over edge 46 of the block holder and is tapped into the block. The downward adjustment of block 29 by means of screws 49 and 50 is effected against the pressure of spring 492. To secure the block to the holder, it is provided with slots 64 and 65 through which pass screws 66 and 67 which are tapped into the block holder 45, the slots 64 and 65 permitting the vertical adjustment of the block.

The block holder is provided at each end with a vertical wing or projection 63 which engages a corresponding slot or wing in the corresponding guide block 38 or 39. As the main shaft revolves the cutting block is reciprocated vertically and at each reciprocation forces the veneer downwardly onto the die causing a blank to be cut therefrom. Succeeding blanks which are thus cut force the preceding one downwardly through the die and when the die is full each subsequent blank that is cut will cause the lowermost blank in the die to drop out. When a blank leaves the die it drops onto the feed roll 35 and into one of the grooves which is formed in the periphery of the said roll. These grooves are preferably formed as shown (Fig. 3) by teeth 511 resembling in cross section the cross sectional shape of the teeth of a ratchet with the highest point in front and sloping back so that as a blank falls on the feed wheel in front of a groove, it will slide down into the groove, thus insuring that the forward movement of the conveyer will cause the blank to be placed in one of the said grooves. The face of the grooved portion of said roll is of a width equal to the length of the body portion of the blank and when the blank is in one of the grooves of said feed roll its end will project at either side thereof.

The feed roll 35 is mounted in a housing which comprises two end portions 51 and 52 which are secured together by means of a curved connecting piece or bracket 68, see Fig. 3, in the shape of a section of a cylinder which is secured at the rear of the said feed roll. The space between the end portions 51 and 52 of the housing at the point where the blanks are fed to the finishing machine equals the length of the blank. The inner faces of the ends 51 and 52 of the housing are beveled as indicated by the dotted lines 70, Fig. 1, and as is shown more clearly in the detail views, Figs. 5, 7 and 8, the bevel being greatest at a point substantially under the cutting die where the blanks fall into the grooves in the feed roll 35. By this means if a blank is not perfectly centered on the feed roll when it falls thereon from the die the forward movement of the feed roll will force the end of that blank which projects farthest into contact with the beveled face 70 of the housing and as this bevel diminishes to nothing at the point where the blank is fed to the finishing machine the blank will be gradually moved over and brought to a central position on the groove of the feed roll and will consequently be fed centrally and in a correct way into the finishing machine. Each end 51 and 52 of the housing has secured thereon a shield 54 which projects inwardly from the housing over the ends of the feed roll, and as the blanks are fed forward their ends pass under these shields and the blanks are held in position in the feed roll grooves, until they are delivered to the finishing machine. Each of the said shields is provided at the lower end with a downwardly projecting portion or extension 55 which projects downwardly into close proximity to the upper end of the concave 3, and thus serves to guide the blank and prevent it from prematurely falling out of its groove in the feed roll 35, thus insuring the accurate and certain delivery of each blank to the finishing machine. To further insure the passage of the blank from under the extensions 55 into the finishing machine the upward projections 72 are secured at either side to the top of the concave 3 and these projections 72 which are pointed extend upwardly into contact with the body portion 73 of the feed roll 35. It will be understood that the body portion of the said feed roll at either side of the grooved portion 35 is of somewhat less diameter than the said grooved portion 35, as will be clear from Fig. 1, and as is indicated by the dotted line 74, Fig. 3. The housing of the roll is mounted on bracket 68 secured to the rear of the concave 3 by screws or similar means. These brackets and the housing serve to support the shaft 57 of the said feed roll 35. The said housing is cut away below the feed roll 35 as shown at 75, Fig. 3 so that any short pieces or fragments of a blank such as are indicated at 76 which are not fed into the finishing machine will drop out of the feed roll 35 through the said opening 75 and thus be clear of the machine.

For the purpose of actuating the feed roll 35 the end of its shaft is provided with a gear 58 which is in mesh with a pinion 59 on a stud 60 mounted on the upright 13 see Fig. 1. Fast to the pinion 59 is a gear 61 which in turn meshes with the pinion 62 on the end of the main shaft 14. By this means the feed roll 35 is slowly rotated from the main shaft, the rotation thereof being properly timed to deliver the blanks to the finishing machine at the speed at which they are cut from the veneer.

Each time a tooth pick is cut from the veneer there is also cut therefrom a piece of waste which falls in front of the die 28 and this waste must be taken out of the way and prevented from getting into the finishing machine. For this purpose we provide an air suction pipe 80, see Fig. 3, which is connected with any suitable air suction apparatus, not shown. The end of this pipe is in contact with the lower portion of the face of the die 28, as shown Fig. 3 and is open. While the machine is in operation a strong current of air is sucked into this pipe through the open end which is in close proximity to the face of the die 28 and the waste pieces as they are severed are sucked through this pipe and discharged at a suitable place clear of the machine. The arrow in the pipe 80, Fig. 3 indicates the direction of the air current and at 81 is shown a fragment or piece of waste on its passage through the said pipe.

By the employment of our machine blanks are continuously cut from the veneer and are automatically fed into the finishing machine which operates to round and finish them prior to the final drying and smoothing operations.

What we claim is:

1. In a machine for making tooth pick blanks or the like from a strip, a cutting die having two blades spaced a distance apart equal to the width of the blank to be formed, a rotating conveyer having on its periphery grooves which, when the conveyer rotates, pass beneath the opening of the blades of the cutting die and receive the blanks from the cutting die, said grooves being of a length less than the length of the blanks, a receiving member to which the blanks are delivered from the grooved conveyer, a housing for the grooved conveyer having annular end flanges, said flanges having beveled inner faces for a portion thereof between which the blanks carried by the conveyer pass, the beveled faces converging toward each other in the direction that the conveyer rotates, the ends of the bevel which are nearest together being spaced apart a distance equal to the length of the blanks, whereby the blanks are all centered with relation to the receiving member.

2. In a machine for making tooth pick blanks or the like from a strip, a cutting die having two blades spaced a distance apart equal to the width of the blank to be formed, a rotating conveyer having on its periphery grooves which, when the conveyer rotates, pass beneath the opening of the blades of the cutting die and receive the blanks from the cutting die, said grooves being of a length less than the length of the blanks, a receiving member to which the blanks are delivered from the grooved conveyer, a housing for the grooved conveyer having annular end flanges, said flanges having beveled inner faces for a portion thereof between which the blanks carried by the conveyer pass, the beveled faces converging toward each other in the direction that the conveyer rotates, the ends of the bevel which are nearest together being spaced apart a distance equal to the length of the blanks, whereby the blanks are all centered with relation to the receiving member, the bevel face following the curve of the annular flange from the point where the conveyer receives the blanks to the point where the converging faces are at their nearest approach to each other.

3. In a machine for cutting tooth pick blanks or the like from a strip, a cutting die, a block which forces the strip against the die, feed rolls between which the strip passes to the cutting mechanism, a table having a guide through which the veneer strip passes to the feed rolls, a spring plate supported at one end to the table and having a free end which extends forward of the table and passes between the feed rolls and supports the veneer strip in its passage from the table to the cutting mechanism, a slot in said spring plate through which the lower feed roll projects to engage with the veneer strip, the forward end of the spring plate normally extending forward at an elevation to cause the veneer strip to be fed over the top of the cutting die.

4. In a machine for cutting tooth pick blanks or the like from a strip, a cutting die, a block which forces the strip against the die, feed rolls between which the strip passes to the cutting mechanism, a table having a guide through which the veneer strip passes to the feed rolls, a spring plate supported at one end to the table and having a free end which extends forward of the table and passes between the feed rolls and supports the veneer strip in its passage from the table and the cutting mechanism, a slot in said spring plate through which the lower feed roll projects to engage with the veneer strip, the forward end of the spring plate normally extending forward at an elevation to cause the veneer strip to be fed over the top of the cutting die, and a resilient stop for said spring plate between the feed rolls and the cutting die which is below the normal position of the spring plate and which is engaged by the spring plate when the spring plate is depressed by the pressure of the plunger on the strip.

5. In a machine for cutting tooth pick blanks or the like from a strip, a cutting die, a plunger block which forces the strip against the die, a holder for said block consisting of a side plate to which said block is bolted, bolt holes extending horizontally through the block and through the holder, said slots being elongated vertically to permit vertical adjustment of the block with relation to the holder but preventing lateral movement of the block with relation to the holder, a bearing plate resting on the top of the block, the holder extending higher than the block and having a horizontal flange which overhangs the said plate on the top of the block with a space between the plate and flange, stop screws which pass through said flange in the holder and engage the said plate, a stud fast to the upper side of said plate and projecting upwardly loosely through a hole in the flange on said holder plate, a spring plate on the upper side of said flange through which said stud passes, said stud having a head on its upper end, the spring being given tension by the setting down of the stop screws so that when the stop screws are loosened the spring will draw up the said stud and plate again to hold it in constant contact with the stop screws.

In testimony whereof we affix our signatures, in presence of two witnesses.

GEORGE P. STANLEY.
WILLIS W. TAINTER.

Witnesses:
WM. A. MACLEOD,
WILLIAM A. COPELAND.